United States Patent
Kitaev

(10) Patent No.: US 7,858,966 B2
(45) Date of Patent: Dec. 28, 2010

(54) PROTECTED QUBIT BASED ON SUPERCONDUCTING CURRENT MIRROR

(75) Inventor: Alexei Kitaev, South Pasadena, CA (US)

(73) Assignee: Microsoft Corporation, Redmond, WA (US)

( * ) Notice: Subject to any disclaimer, the term of this patent is extended or adjusted under 35 U.S.C. 154(b) by 1072 days.

(21) Appl. No.: 11/602,856

(22) Filed: Nov. 21, 2006

(65) Prior Publication Data

US 2008/0116448 A1    May 22, 2008

(51) Int. Cl.
*H01L 29/06* (2006.01)
*H01L 21/00* (2006.01)

(52) U.S. Cl. ............................. 257/36; 257/30; 257/31; 257/34; 257/661; 257/E39.003; 257/E39.012; 257/E39.014

(58) Field of Classification Search ................... 257/14, 257/30, 31, 34, 36, 661, E39.003, E39.012, 257/E39.014

See application file for complete search history.

(56) References Cited

U.S. PATENT DOCUMENTS

| | | | | |
|---|---|---|---|---|
| 5,768,297 | A | 6/1998 | Shor ........................ | 371/40.11 |
| 6,459,097 | B1 | 10/2002 | Zagoskin ..................... | 257/31 |
| 6,605,822 | B1 | 8/2003 | Blais et al. ................... | 257/34 |
| 6,627,915 | B1 | 9/2003 | Ustinov et al. ............... | 257/31 |
| 6,960,780 | B2* | 11/2005 | Blais et al. .................... | 257/14 |
| 7,230,266 | B2* | 6/2007 | Hilton et al. .................. | 257/31 |
| 7,307,275 | B2* | 12/2007 | Lidar et al. ................... | 257/31 |
| 7,418,283 | B2* | 8/2008 | Amin .......................... | 505/170 |
| 2002/0121636 | A1 | 9/2002 | Amin et al. .................... | 257/9 |
| 2003/0164490 | A1 | 9/2003 | Blais .......................... | 257/14 |
| 2003/0207766 | A1 | 11/2003 | Esteve et al. ................ | 505/190 |
| 2004/0000666 | A1 | 1/2004 | Lidar et al. .................... | 257/31 |
| 2004/0016918 | A1 | 1/2004 | Amin et al. .................... | 257/14 |
| 2005/0082519 | A1 | 4/2005 | Amin et al. ................... | 257/13 |

FOREIGN PATENT DOCUMENTS

WO    WO 2004/086295 A1    10/2004

OTHER PUBLICATIONS

Computer-assisted English translation of Japanese patent publication 2004-319932, by Yoshinao Mizugaki, Nov. 11, 2004.*

Choi-M-S. et al., "Cotunneling Transport and Quantum Phase Transitions in Coupled Joesphson-Junction Chains with Charge Frustration", *Physical Review Letters*, 1998, 81(19), 4240-4243.

Cleve, R. et al., "Efficient Computations of Encodings for Quantum Error Correction", Jul. 31, 1996, http://puhep1.princeton.edu, 16 pages.

Doucot, B. et al., "Pairing of Copper Pairs in a Fully Frustrated Josephson-Junction Chain", *Physical Review Letters*, 2002, 88(22), 227005-1-227005-4.

(Continued)

*Primary Examiner*—Dao H Nguyen
(74) *Attorney, Agent, or Firm*—Woodcock Washburn LLP

(57) ABSTRACT

A qubit implementation based on exciton condensation in capacitively coupled Josephson junction chains is disclosed. The qubit may be protected in the sense that unwanted terms in its effective Hamiltonian may be exponentially suppressed as the chain length increases. Also disclosed is an implementation of a universal set of quantum gates, most of which offer exponential error suppression.

20 Claims, 7 Drawing Sheets

OTHER PUBLICATIONS

Gottesman, D. et al., "Encoding a Qubit in an Oscillator", May 13, 2001, 1-22.

Ioffe, L.B. et al., "Possible Realization of an Ideal Quantum Computer in Josephson Junction Array", *Physical Review B*, 2002, 66, 224503-1-224503-8.

Lee, M. et al., "Quantum Phase Transitions and Persistent Currents in Josephson-Junction Ladders", *Physical Review*, 2003, 68, 144506-1-144506-11.

Mahklin, Y. et al., "Josephson-Junction Qubits with Controlled Couplings", Aug. 6, 1998, http://haithabu.fy.chalmers.se, 1-5.

Shimada, H. et al., "Current Mirror Effect and Correlated Cooper-Pair Transport in Coupled Arrays of Small Josephson Junctions", *Physical Review Letters*, 2000, 85(15), 3253-3256.

Shor, P.W., "Scheme for Reducing Decoherence in Quantum computer Memory", http://theory.caltech.edu/people/preskill, 1-4.

Van der Wal, C.H. et al., "Engineering Decoherence in Josephson Persistent-Current Qubits", *The European Physical Journal B*, 2003, 31, 111-124.

* cited by examiner

PROTECTED QUBIT BASED ON SUPERCONDUCTING CURRENT MIRROR

BACKGROUND

Physical implementation of a quantum computer presents a great challenge because quantum systems are susceptible to decoherence and because interactions between them cannot be controlled precisely. Quantum bits (a.k.a., qubits) must satisfy two basic requirements: they must preserve the quantum state intact for a sufficiently long time, and they must be easily operable. It has proved very difficult to meet both conditions together.

There have been impressive demonstrations of qubits using various kinds of systems, including Josephson junctions, yet building a full-scale computer remains a remote goal. In principle, scalability can be achieved by correcting errors at the logical level, but only if the physical error rate is sufficiently small. As an alternative solution, it has been observed that topologically ordered quantum systems are physical analogues of quantum error-correcting codes, and fault-tolerant quantum computation can be performed by braiding anyons.

Simpler examples of physical systems with error-correcting properties have been found. The key element of such systems, which may be referred to herein as 0-π qubit, is a two-terminal circuit built of Josephson junctions. Its energy has two equal minima when the superconducting phase difference between the terminals, $\theta=\phi_1-\phi_2$, is equal to 0 or π. The quantum states associated with the minima, $|0\rangle$ and $|1\rangle$ can form quantum superpositions. It is essential that the energy difference between the two minima is exponentially small in the system size, even in the presence of various perturbations, hence the quantum superposition will remain unchanged for a long time. Implementations of some quantum gates have also been proposed.

SUMMARY

The application of qubits for universal or specialized quantum computation requires some implementation of quantum gates. The following gates are described: 1) measurement in the standard basis; 2) measurement in the dual basis; 3) one-qubit unitary gate $R(\pi/4)=\exp(i(\pi/4)\sigma^z$ and its inverse Josephson junction current mirror; 4) two-qubit unitary gate $R_2(\pi/4)=\exp(i(\pi/4)\sigma_1^z\sigma_2^z$ and its inverse; and 5) one-qubit unitary gate $R(\pi/8)=\exp(i(\pi/8)\sigma^z$ and its inverse.

It is very desirable for the gates to be fault-tolerant at the physical level or at least to limit possible errors to some particular types. Such an implementation is described herein. It involves a choice of a nonstandard but computationally universal set of gates that are particularly suitable for use with 0-π qubits. The computation is adaptive, i.e., it involves intermediate measurements whose outcome determines the choice of the next gate to be applied. A concrete realization of the gates is described.

To show that the set of gates disclosed herein is universal, it may first be observed that repeated applications of noncommuting measurements allow one to prepare any of these states: $|0\rangle, |1\rangle, |+\rangle, |-\rangle$. It may also be observed that $R(-\pi/4)$ is equal to $\Lambda(i)$ up to an overall phase, where $\Lambda(i)|a\rangle=i^a|a\rangle$ for $a=0, 1$. One can also implement the two-qubit controlled phase gate $\Lambda^2(-1)$ that acts as follows: $\Lambda^2(-1)|a,b\rangle=(-1)^{ab}|a,b\rangle$. Specifically, $\Lambda^2(-1)$ is equal to $R_2(-\pi/4)(R(-\pi/4)\otimes R(-\pi/4))$ up to an overall phase. If we add the Hadamard gate H, we obtain all Clifford (i.e., simplectic) gates.

The Hadamard gate may be realized according to the following adaptive procedure. A qubit may be provided in an arbitrary state $|\psi\rangle=c_0|0\rangle+c_1|1\rangle$, and supplemented with a $|+\rangle$ ancilla. Then, $\Lambda^2(-1)$ may be applied. The first qubit may then be measured in the dual basis. The second qubit now contains $H|\psi\rangle$ or $\sigma^x H|\psi\rangle$, depending on the measurement outcome. In the second case, the procedure may be repeated 2, 4, 6, . . . times, until a desired result is achieved.

Using the Clifford gates and the ability to create copies of $|\xi\rangle=R(\pi/8)|+\rangle$, one can perform quantum computation. Furthermore, if the Clifford gates are exact, the ancillary state $|\xi\rangle$ needs to be prepared with fidelity F>0.93. This gives more than 50% tolerance for choosing the parameter u≈π/8 in $R(u)=\exp(iu\sigma^z)$.

Thus, a concrete design that belongs to a class of 0-π superconducting qubits may be described. Such a design may include a current mirror device with four leads connected diagonally. This design makes it possible to perform a measurement with respect to the dual basis by breaking one of the connecting wires, using whatever technique that is suitable to measure the offset charge of a capacitor. A fault-tolerant scheme is also described, including a universal set of gates and their schematic implementations. This scheme can be used with any kind of 0-π superconducting qubits.

A qubit may be implemented as a circuit of Josephson junctions with built-in error-correcting properties. As a result, the rate of decoherence (decay of the quantum state) may be decreased by a factor that is exponential in the circuit size. Quantum operations can be performed by breaking some connections in the circuit, or by connecting two qubits via superconducting wires. Some aspects of the quantum protection remain in effect even when the operations are performed.

DETAILED DESCRIPTION

A novel design of a 0-π qubit based on the current mirror effect in capacitively coupled chains of Josephson junctions will now be described. An analogue of this effect in normal-metal junctions is due to correlated electron-hole tunneling. In superconducting chains, the tunneling objects are Cooper pairs. Positive and negative Cooper pairs (with electric charge +2e in one chain and −2e in the other chain) tend to tunnel together. Under suitable conditions, the currents in the two chains are opposite in direction and almost equal in magnitude. This has been observed experimentally in the resistive state, i.e., at sufficiently large voltage bias. A more delicate, dissipationless form of this effect, which has not been observed, has been predicted theoretically for the case of strong interchain coupling. In this regime, the Josephson junction ladder behaves as an almost perfect DC transformer with 1:1 current-to-voltage ratio.

Figure 1A:
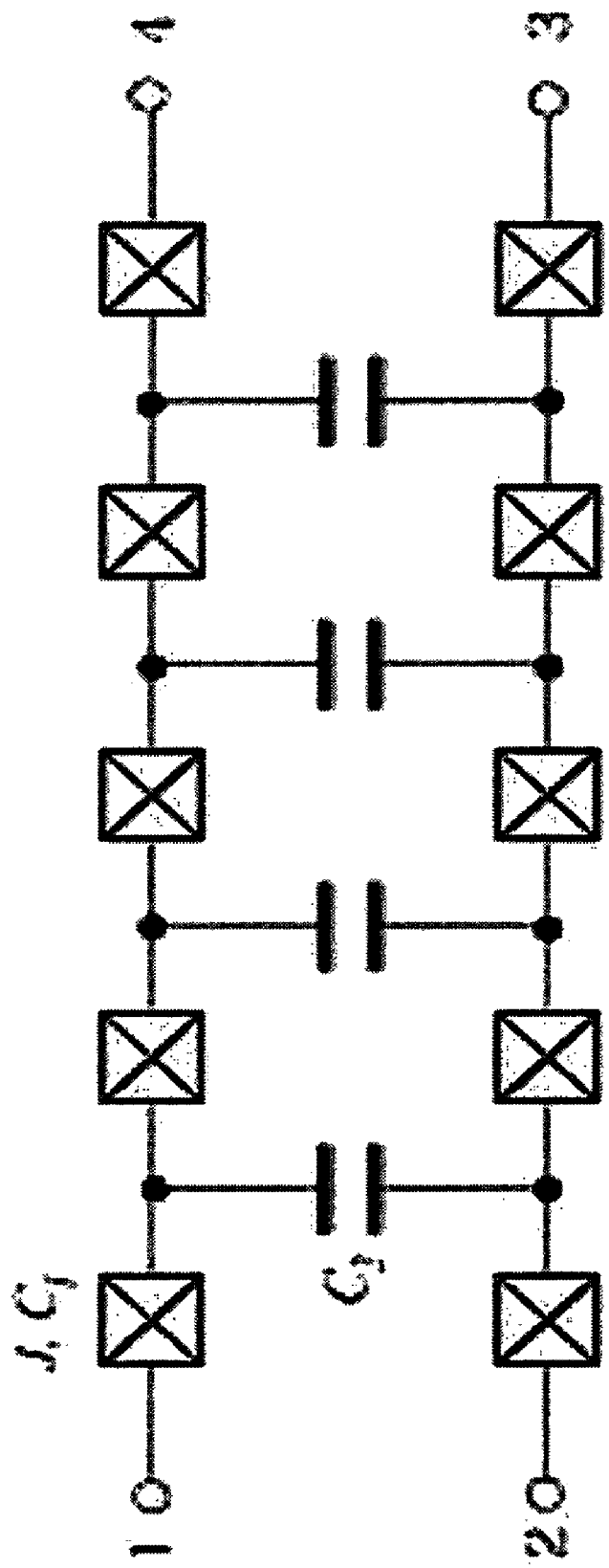
FIG. 1A is a functional block diagram of an example superconducting current mirror.

FIG. 1A is a functional block diagram of an example superconducting current mirror, or "ladder." As shown, a current mirror may include a plurality of Josephson junctions J, interconnected by superconducting wires W. Each Josephson junction may have Josephson energy J and capacitance $C_1$. Interchain capacitors C (connected to form "rungs" on the "ladder") may have capacitance $C_2$. The mirror may have four terminals 1-4.

If $C_2 \gg C_1$, excitons of +2e in one chain and −2e in the other chain may have lower energy than individual ±2e quasiparticles or other excitations that change the total charge on some rungs of the ladder. The energy scales for excitons and unbalanced charge fluctuations are given by $E_{ex} \sim e^2/C_2$ and $E_1 \sim e^2/C_1$, respectively. Excitons form a Bose condensate if $E_{ex} \lesssim J_{ex}$, where $J_{ex} \sim J^2/E_1$ is a characteristic hopping energy (we assume $J \lesssim E_1$). In this regime, the system becomes superconducting with respect to opposite currents in the two chains while being insulating with respect to passing net electric charge along the ladder. It is worth noting that the exciton condensate persists in the presence of charge frustration.

The current mirror device may be characterized by an effective potential energy E that depends on the values of the superconducting phase $\phi_1$, $\phi_2$, $\phi_3$, $\phi_4$ at each of the four terminals 1-4, respectively. The order parameter of the exciton condensate may be represented as the superconducting phase difference between the chains, which is equal to $\theta_l = \phi_1 - \phi_2$ at the left end of the ladder and $\theta_r = \phi_4 - \phi_3$ at the right end of the ladder. Thus, the energy may be expected to depend primarily on $\theta_l - \theta_r = \phi_1 - \phi_2 + \phi_3 - \phi_4$:

$$E = F(\phi_1 - \phi_2 + \phi_3 - \phi_4) + f(\phi_1 - \phi_4, \phi_2 - \phi_3), \quad (1)$$

where f is an "error term." Since the current through the j-th terminal is proportional to $\partial E/\partial \phi$, the error term characterizes the net current through the ladder. Such current can only be carried by ±2e quasiparticles tunneling through the insulator, but this process is suppressed by factor $\exp(-N/N_0)$, wherein N is the length (i.e., the number of junctions in each chain) and $N_0 \sim 1$. On the other hand, the F term in Eq. (1) is of the order of $J_{ex}/N$.

Figure 1C:
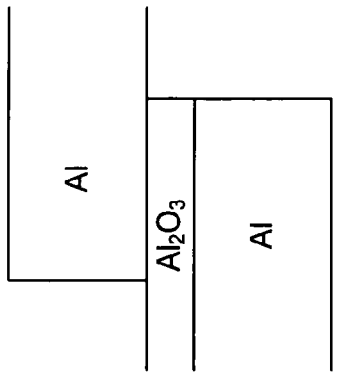
FIGS. 1B and 1C depicts a physical embodiment of a portion of the superconducting mirror of FIG. 1A.
Figure 1B:
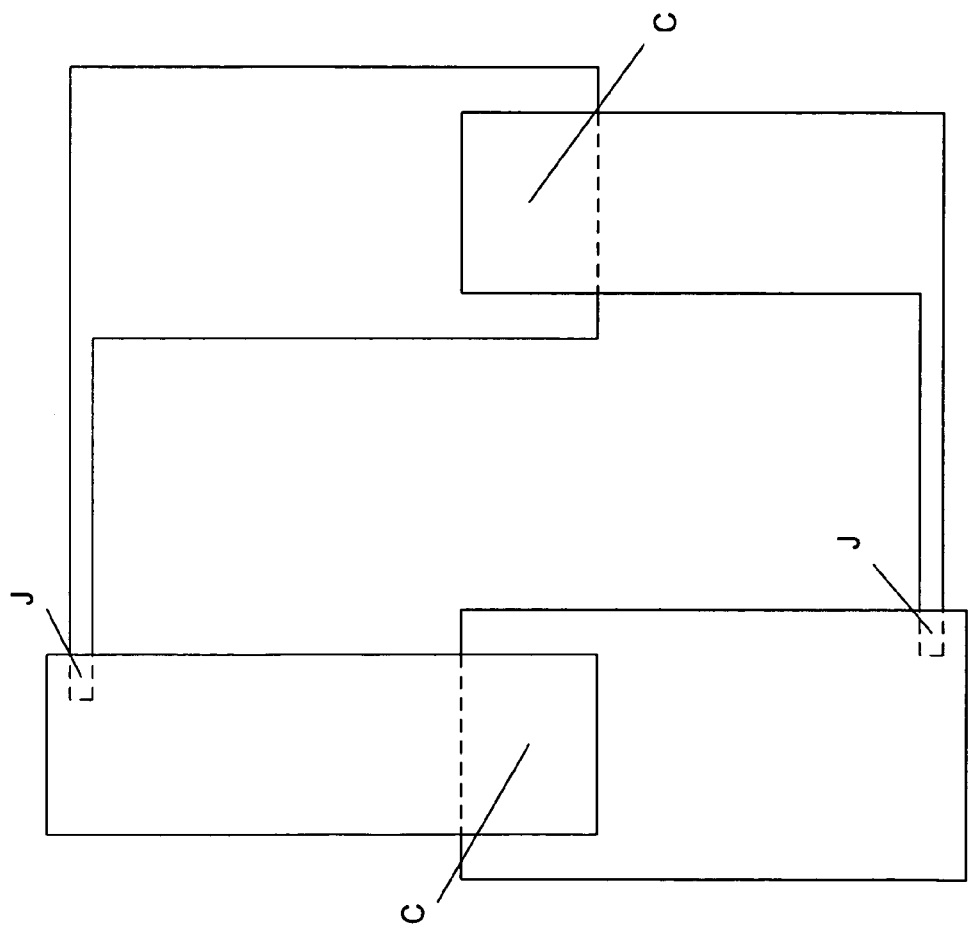

Such a current mirror may be realized physically as depicted in FIGS. 1B and 1C. As shown in FIG. 1C, a layer of $Al_2O_3$, for example, may be deposited on a first layer of Al. A second layer of Al may be deposited over the layer of $Al_2O_3$. As best seen in FIG. 1B, the amount that the second Al layer overlaps the $Al_2O_3$ layer determines the amount of capacitance, while the thickness of the $Al_2O_3$ layer determines whether tunneling will occur. Thus, as shown, with a relatively small overlap and a thin $Al_2O_3$ layer, a Josephson junction J may be formed. Where the overlap is relatively large but the insulating $Al_2O_3$ layer is thicker, a classical capacitor may be formed.

A simple design of the $0-\pi$ qubit will now be described. The four leads 1-4 may be connected diagonally (i.e., 1 with 3 and 2 with 4). Thus, $\phi_1 = \phi_3$, $\phi_2 = \phi_4$, and $E \approx F(2(\phi_1 - \phi_2))$ with exponential precision. As the function $F(\theta)$ has a minimum at $\theta = 0$, the energy of the qubit has two minima, at $\phi_1 - \phi_2 = 0$ and $\phi_1 - \phi_2 = \pi$. Note that all variables $\phi_j$ are defined modulo $2\pi$. The energy values at the minima are exponentially close to each other: $\delta E \propto \exp(-N/N_0)$. That is the reason for protection against dephasing. To prevent bit flips, one needs to make sure that $E \gg e^2/C$, where $C = NC_2$ is total interchain capacitance. Note that the ratio $E/(e^2/2C) \sim J_{ex}/E_{ex}$ does not depend on length. It can be increased by increasing the interchain coupling or by connecting several current mirrors in parallel.

With this qubit design, which saves the quantum state of the qubit, it is possible to do measurements in the standard bases (of states |0> and |1> corresponding to $\phi_1 - \phi_2 = 0$ and $\phi_1 - \phi_2 = \pi$, respectively) as well as the dual basis, $$|\pm\rangle = \frac{1}{\sqrt{2}}(|0\rangle \pm |1\rangle).$$

They may also be called "phase basis" and "charge basis," respectively.

Figure 2:
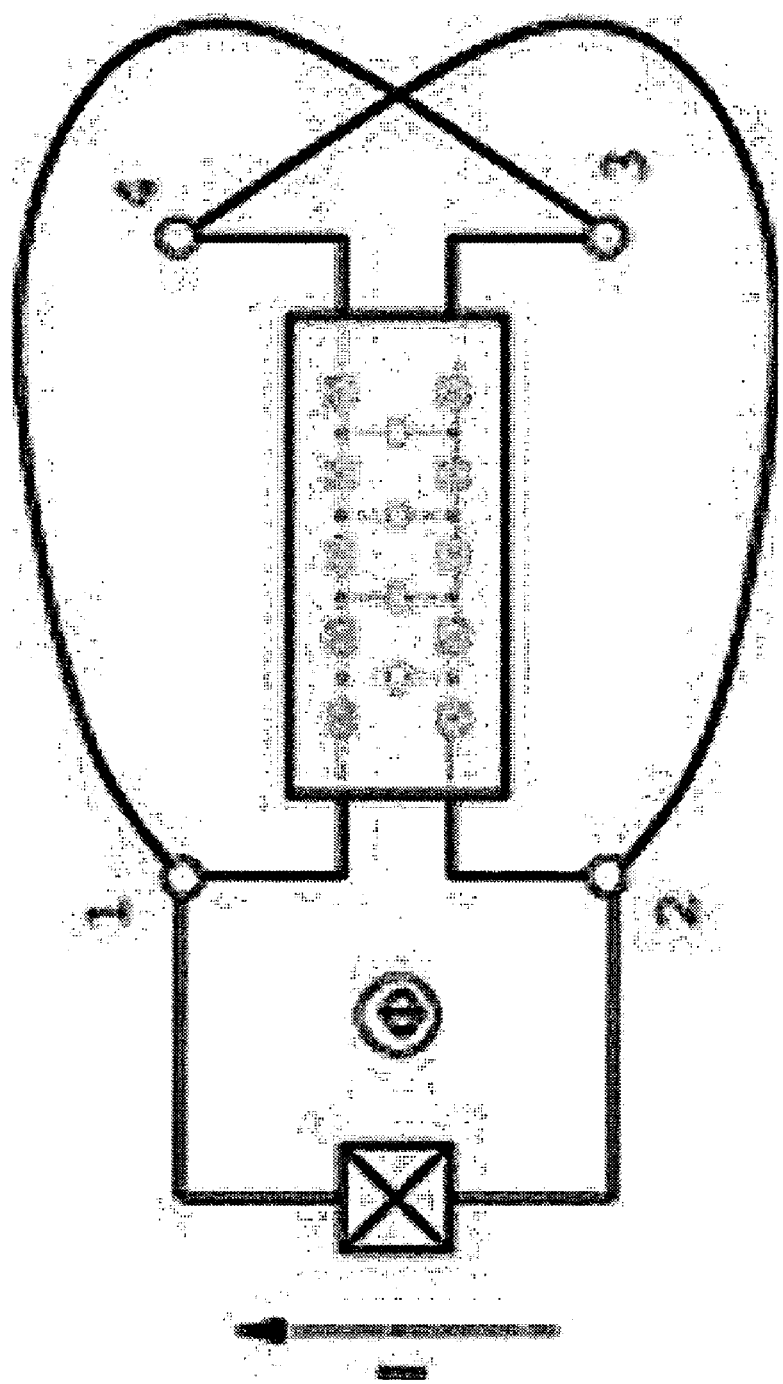
FIG. 2 depicts measurement in the standard basis.

Measurement in the phase basis, as shown in FIG. 2, may be performed by connecting leads 1 and 2 to a measuring current. For example, if the leads are connected via a Josephson junction J, the current I in the loop (from terminal 2 to terminal 1 through the Josephson junction J) depends on $\phi_1 - \phi_2 = 0$ and the magnetic flux 4 through the loop, i.e., $I = J \sin(\phi_1 - \phi_2 + \Phi)$. The state (e.g., |0> or |1>) can be determined from the direction in which the current I flows. It should be understood that, although only a single $0-\pi$ qubit is shown in FIG. 2, measurement in the standard (phase) basis may employ any system of one or more $0-\pi$ qubits.

Figure 3:
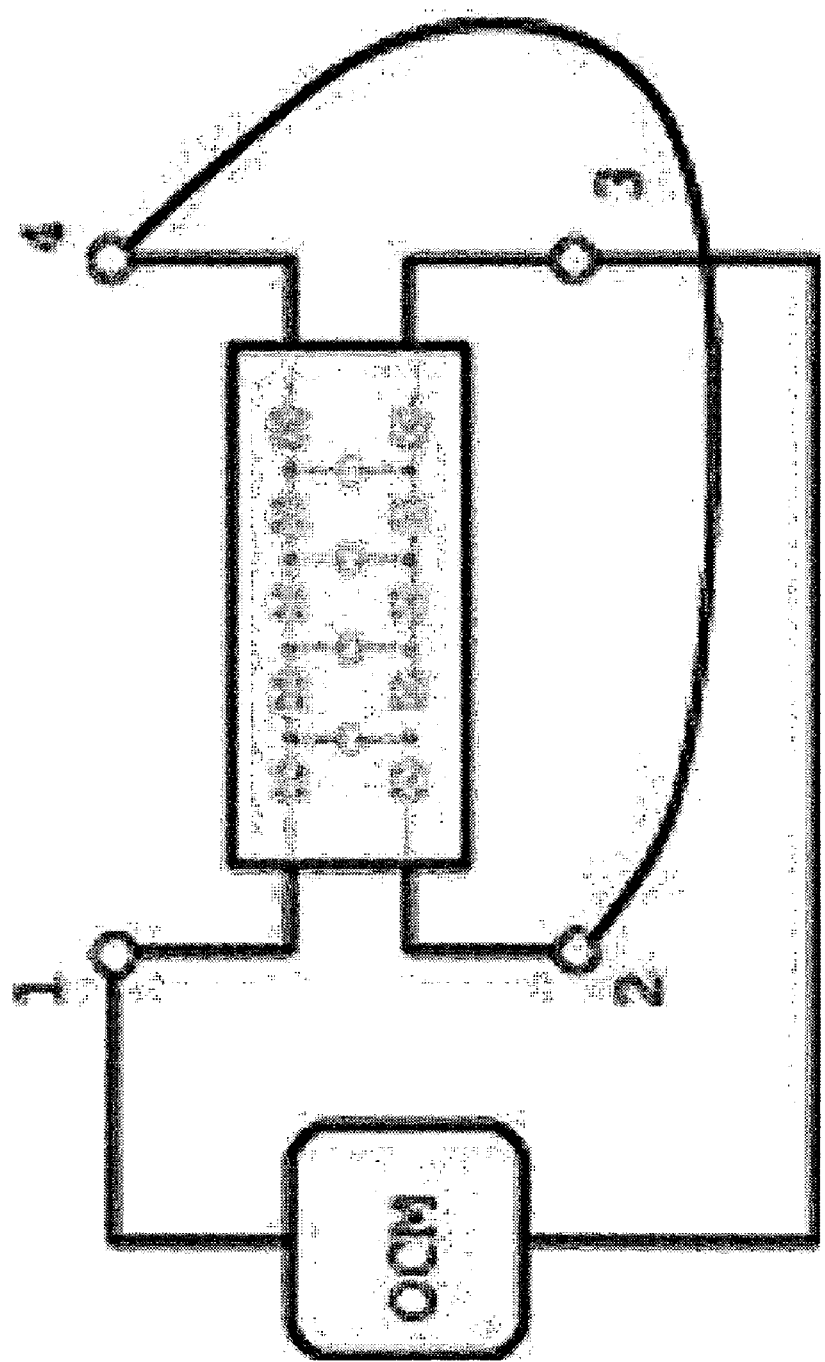
FIG. 3 depicts measurement in the dual basis.

Measurement in the dual basis may be more complicated. As shown in FIG. 3, the key idea is to break the wire between 1 and 3, and attach some offset charge measuring (OCM) circuit to those leads. Now $$\phi_2 = \phi_4 = (\phi_1 + \phi_3)/2 (\mathrm{mod}\, \pi). \quad (2)$$

It should be understood that current will not flow, but the current mirror will charge. Furthermore, the potential energy is practically independent of the superconducting phase difference, $\theta = \phi_1 - \phi_3$ across the device. Consequently, direct superconducting current cannot flow. The device behaves basically as a capacitor with the effective Hamiltonian $$H_{cap} = \frac{(2e)^2}{2C}\left(\frac{\partial}{i\partial \theta} - n_g\right)^2, \quad (3)$$

except that it has an internal degree of freedom, because, for fixed values of $\phi_1$, $\phi_3$, Eq. (2) has two solutions. The states |+> and |−> correspond to the symmetric and antisymmetric superposition of these solutions, and the wave function $\psi(\theta)$ satisfies the boundary condition $\psi(2\pi) = \psi(0)$ or $\psi(2\pi) = -\psi(0)$, respectively. The second boundary condition becomes equivalent to the first one if $n_g$ is changed by ½. The parameter $n_g$ is a so-called offset charge measured in units of 2e. It is defined modulo 1. Thus, the measurement in the |±> basis amounts to distinguishing between $n_g$ and $n_g + \frac{1}{2}$. From a practical perspective, $n_g$ need not be known in advance. Indeed, it is only important to tell the two states apart while the labels "+" and "−" can be assigned arbitrarily.

Offset charge corresponds to the internal state of qubit. Accordingly when offset charge is measured, the internal state of the qubit is measured. Charge, however, cannot be measured directly. The OCM circuit measures the difference between energy levels of the system. The energy spectrum of a capacitor is described by the formula $E_n = (2e^2/C)(n - n_g)^2$, hence the value of $n_g$ can be inferred from the measurement of the difference between two levels, e.g., $E_1$ and $E_0$. Where $n_g = 0$, the state is |+>. Where $n_g = \frac{1}{2}$, the state is |−>.

It can readily be seen that the implementation of measurements described above is fault-tolerant since the measured observable (i.e., the superconducting phase or the offset charge) is as unlikely to change during the process as in an isolated qubit.

Figure 4:
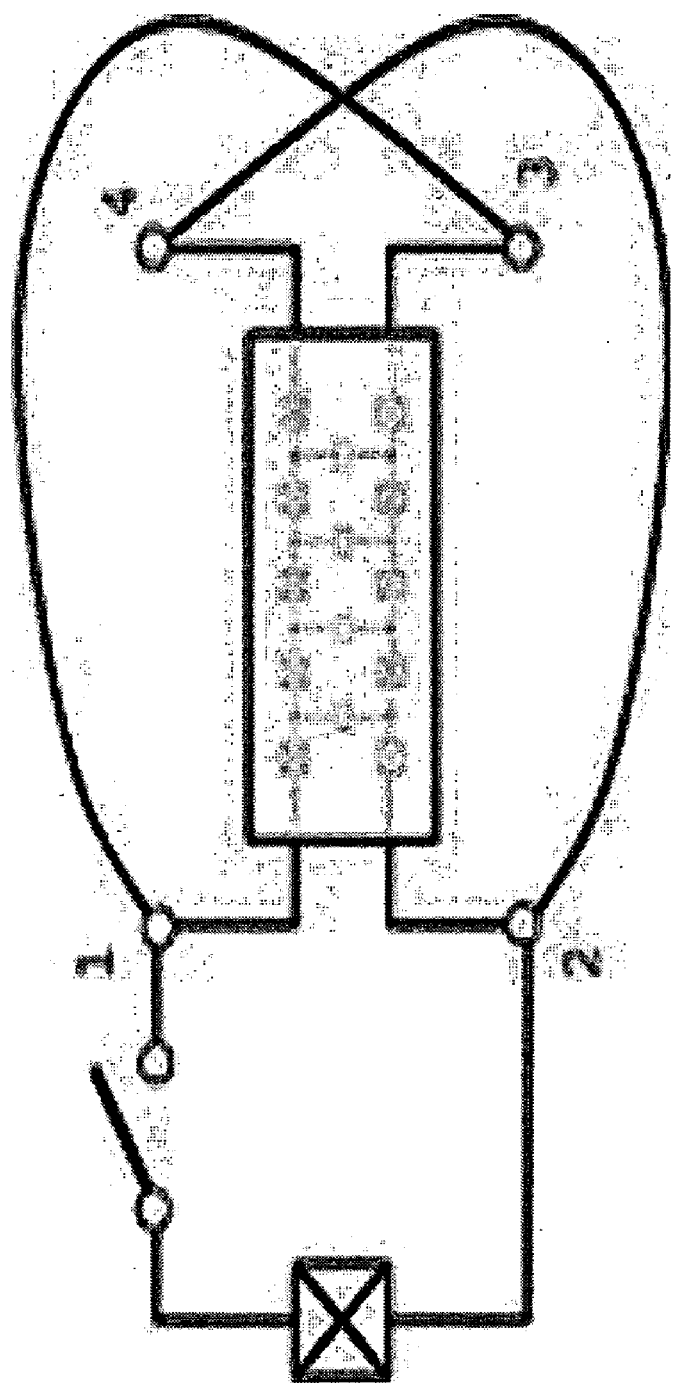
FIG. 4 depicts an example realization of the gate R(u) for arbitrary u.

A one-qubit unitary gate $R(\pi/8)=\exp(i(\pi/8)\sigma^z)$, and its inverse, will now be described with reference to FIG. 4. Generally, a gate R(u) may be realized by connecting the leads 1 and 2 to a Josephson junction J for a certain period of time. This procedure is generally sensitive to random variations of the time interval and the strength of the Josephson coupling.

To operate the gate, the switch may be closed for an interval of time. While the switch is closed, the qubit state evolves in a certain way. The effect of the switch closure is that the qubit state is multiplied by the operator $R(\pi/8)$. Accordingly, such a gate may be used to change the state of the system in a certain way.

Figure 5A:
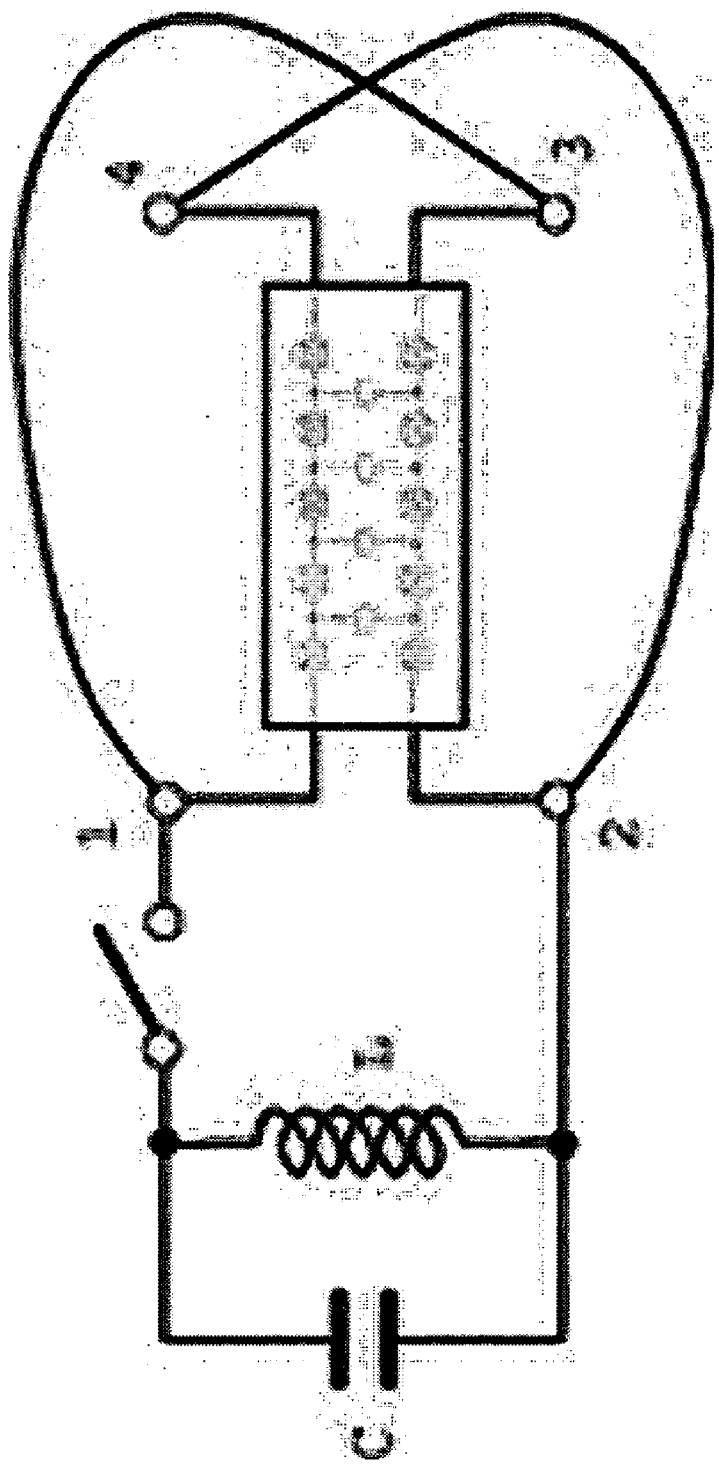
FIGS. 5A and 5B depict example fault-tolerant realizations of R(π/4) and $R_2(\pi/4)$, respectively.

A circuit for a fault-tolerant implementation of $R(\pi/4)=\sqrt{i}\,\vec{\Lambda}(-i)$ is shown schematically in FIG. 5A. The 0-π qubit is connected to an ultraquantum LC-oscillator (with $$r \stackrel{def}{=} (e^2/h\sqrt{L/C} \gg 1)$$

for a certain period of time τ. The operation of this gate may be described in terms of the superconducting phase difference θ across the inductor.

Initially, the oscillator is in its ground state characterized by a Gaussian wave function $\omega_0(\theta)$. Note that $\langle\theta^2\rangle\sim r\gg 1$. Once the circuit is closed, the quantum evolution is governed by the effective Hamiltonian $$H_L=(h^2/8e^2)L^{-1}\theta^2 \quad (4)$$

where θ takes on multiples of 2π if the qubit is in the state 0, or on values of the form 2π(n+½) if the qubit is in the state 1. Thus, the wave function ψ(θ) has the form of a grid: it consists of narrow peaks at the said locations. If $\tau=8L(e^2/h)$, then all peaks with θ=2πn pick up no phase and all peaks with θ=2π(n+½) are multiplied by −i. Thus, the gate Λ(−i) is effectively applied to the qubit state, not entangling it with the oscillator.

In other words, when the switch is closed, a superposition of states is obtained, each state having a different current through the inductor. While the switch is closed, the superposition evolves. After time, the superposition assumes a certain form, such that when the switch is opened, an effective operation has been applied to the qubit.

Such a gate may be operated in three phases. First, the switch may be closed. Then, the superposition may be allowed to evolve for an interval of time. Third, the system may be transitioned back to its qubit state (i.e., the switch may be opened). Then, one can measure the state of the system as described above. This gate tolerates small errors in the time it takes to open and close the switch.

Some conditions should be met for this scheme to work. The closing and breaking of the circuit should occur smoothly enough so that no excitation is produced in the switch itself, but faster than the LC oscillation period. Then the qubit is transformed into a Gaussian grid state, i.e., the superposition of peaks with a Gaussian envelope. Such states are known to have good error-correcting properties. If the protocol is not followed exactly, but with small error, the error will mainly result in oscillations in the LC circuit after the cycle is complete, leaving the qubit state unaffected.

Figure 5B:
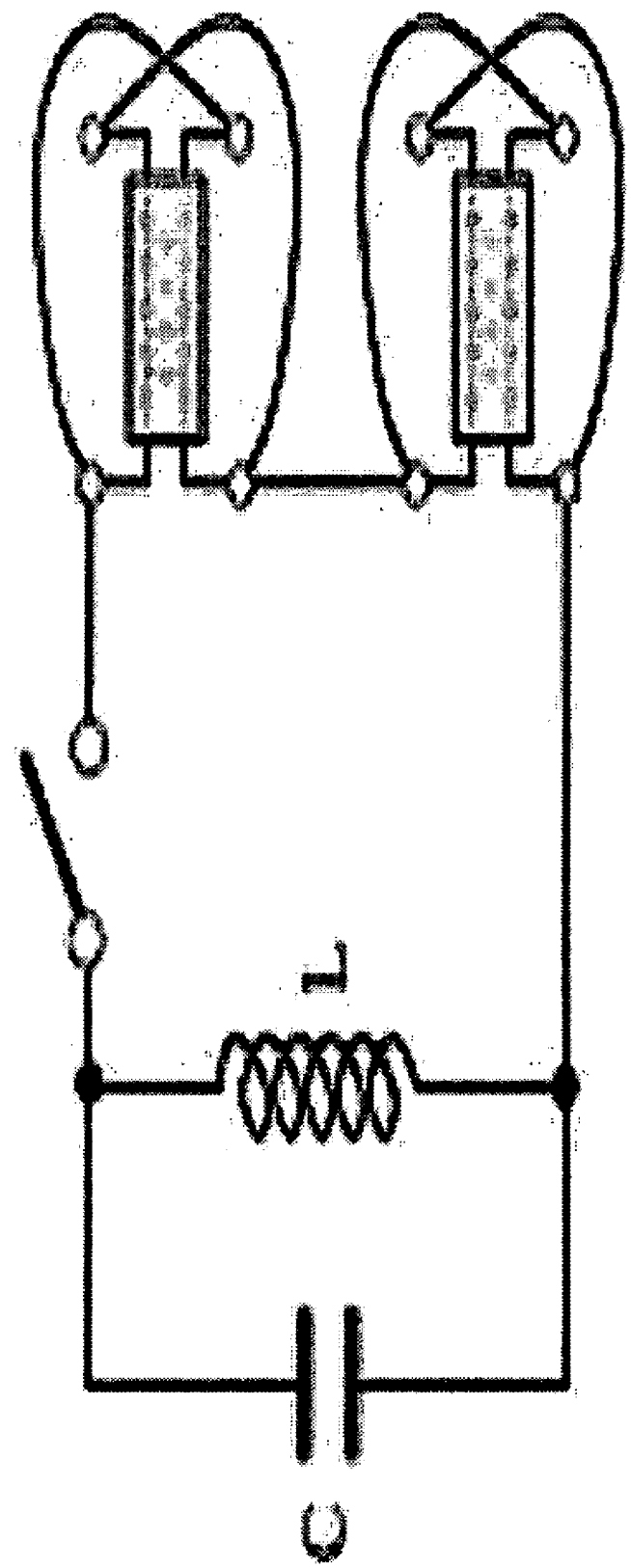

As shown in FIG. 5B, the gate $R_2(\pi/4)$ is implemented similarly. One merely needs to connect the two 0-π qubits in series. This gate involves interaction between qubits. A quantum computer may be defined by a system of qubits. One needs to perform certain transformations with these qubits. The state of the system of qubits can be evolved using this gate.

What is claimed:

1. A qubit circuit comprising a Josephson junction current mirror, the Josephson junction comprising a first chain of series coupled Josephson junctions coupled between first and fourth terminals and a second chain of series coupled Josephson junctions coupled between second and third terminals, wherein the first and second chains are diagonally coupled so that the first and third terminals are coupled together and the second and fourth terminals are coupled together.

2. The qubit circuit of claim 1, wherein the first and third terminals are current input terminals and the second and fourth terminals are current output terminals.

3. The qubit circuit of claim 2, wherein the terminals are coupled to the current mirror via superconducting wires.

4. The qubit circuit of claim 2, wherein the second terminal is connected to the fourth terminal via a superconducting wire.

5. The qubit circuit of claim 4, wherein the first terminal is connected to the third terminal via a superconducting wire.

6. The qubit circuit of claim 1, wherein the qubit circuit comprises a fault-tolerant quantum gate.

7. The qubit circuit of claim 6, wherein an ultraquantum LC-oscillator and switch are series coupled between the first and second terminals.

8. The qubit circuit of claim 1, wherein each point between two adjacent Josephson junctions in the first chain is capacitively coupled to a corresponding point between two adjacent Josephson junctions in the second chain.

9. The qubit circuit of claim 1, wherein a standard basis measurement circuit is coupled between the first and second terminals.

10. The qubit circuit of claim 1, wherein a Josephson Junction is coupled between the first and second terminals.

11. The qubit circuit of claim 1, wherein a Josephson Junction and a switch are series coupled between the first and second terminals.

12. A quantum gate comprising:
a partial qubit comprising:
a Josephson junction current mirror comprising a first chain of series coupled Josephson junctions coupled between first and fourth terminals and a second chain of series coupled Josephson junctions coupled between second and third terminals,
wherein the second terminal is connected to the fourth terminal via a superconducting wire; and
a circuit that is coupled between the first and third terminals, the circuit being adapted to provide for a measurement of a quantum state of the partial qubit.

13. The quantum gate of claim 12, wherein the circuit comprises an offset charge measuring circuit.

14. The quantum gate of claim 13, wherein the offset charge measuring circuit provides for measurement of a dual basis quantum state of the partial qubit.

15. The quantum gate of claim 14, wherein the offset charge measuring circuit measures an energy spectrum of the current mirror.

16. A quantum gate comprising:
a first qubit circuit comprising a Josephson junction current mirror having a first chain of series coupled Josephson junctions coupled between first and fourth terminals and a second chain of series coupled Josephson junctions coupled between second and third terminals, wherein the first and second chains are diagonally coupled so that the first and third terminals are coupled together and the second and fourth terminals are coupled together and wherein standard basis states |0> and |1> are characterized by a superconducting phase difference 0 and $\pi$ between the two external superconducting terminals; and an inductor-capacitor circuit coupled between the first and second terminals, wherein the inductor-capacitor circuit is adapted to affect a quantum superposition of the standard basis states.

17. The quantum gate of claim 16, wherein the first and third terminals are current input terminals and the second and fourth terminals are current output terminals.

18. The quantum gate of claim 17, wherein the quantum gate further comprises a series coupled switch disposed between the inductor-capacitor circuit and the first qubit circuit.

19. The quantum gate of claim 18, wherein the inductor-capacitor circuit is coupled to one of the current output terminals, and the switch is disposed between the inductor-capacitor circuit and one of the current input terminals.

20. The quantum gate of claim 19, further comprising a second qubit circuit having the same configuration as the first qubit circuit, wherein the second qubit circuit is coupled to the inductor-capacitor circuit in series with the first qubit circuit.

* * * * *